United States Patent
Peng et al.

(10) Patent No.: US 12,439,888 B2
(45) Date of Patent: Oct. 14, 2025

(54) PET CARE MACHINE

(71) Applicant: SUZHOU VACS ELECTRICAL CO.,LTD., Jiangsu (CN)

(72) Inventors: Jinsong Peng, Jiangsu (CN); Yu Liang, Jiangsu (CN)

(73) Assignee: SUZHOU VACS ELECTRICAL CO.,LTD., Jiangsu (CN)

( * ) Notice: Subject to any disclaimer, the term of this patent is extended or adjusted under 35 U.S.C. 154(b) by 0 days.

(21) Appl. No.: 19/007,532

(22) Filed: Jan. 1, 2025

(65) Prior Publication Data

US 2025/0234842 A1 Jul. 24, 2025

(30) Foreign Application Priority Data

Jan. 18, 2024 (CN) .......................... 202410076365.6

(51) Int. Cl.
- *A01K 13/00* (2006.01)
- *A47L 5/24* (2006.01)
- *A47L 9/06* (2006.01)

(52) U.S. Cl.
CPC .............. *A01K 13/002* (2013.01); *A47L 5/24* (2013.01); *A47L 9/0633* (2013.01); *A47L 9/0666* (2013.01)

(58) Field of Classification Search
CPC ... A01K 13/002; A47L 9/0633; A47L 9/0653; A47L 9/0666; A47L 5/14; A47L 5/24
USPC ................... 119/628, 629; 15/402, 345, 346
See application file for complete search history.

(56) References Cited

U.S. PATENT DOCUMENTS

| | | | | |
|---|---|---|---|---|
| 4,100,644 | A * | 7/1978 | Johansson | A47L 9/02 15/397 |
| 7,665,181 | B2 * | 2/2010 | Gebhard | A47L 5/14 15/320 |
| 7,788,765 | B2 * | 9/2010 | Allen | A47L 7/0009 15/345 |
| 9,010,276 | B1 * | 4/2015 | Nevitt | A45D 24/32 119/625 |
| 10,098,322 | B2 * | 10/2018 | Ferrentino | B26B 19/44 |
| 10,531,773 | B2 * | 1/2020 | Wang | A47L 5/26 |
| 2011/0030620 | A1 * | 2/2011 | Jouan | A01K 13/002 119/611 |
| 2017/0196429 | A1 * | 7/2017 | Brown | A47L 11/4075 |

FOREIGN PATENT DOCUMENTS

| | | | |
|---|---|---|---|
| CN | 201523596 | | 7/2010 |
| GB | 219017 | * | 4/1925 |
| WO | WO-2015035548 A1 | * | 3/2015 ........... A47L 9/0483 |

* cited by examiner

*Primary Examiner* — Bryan R Muller
(74) *Attorney, Agent, or Firm* — JCIP GLOBAL INC.

(57) ABSTRACT

The present disclosure provides a pet care machine, including a machine housing, internally provided with an air channel having at least one air channel inlet and at least one air channel outlet; an electric fan, configured to stir air and form an air flow flowing into at least one air channel inlet and out of at least one air channel outlet; a combing member, comprising at least one group of comb teeth, wherein the comb teeth has a received state and an extended state; a motion area, located outside the air channel and communicating at least one air channel outlet with at least one air channel inlet and providing a space for transition of the comb teeth between the extended state and the received state.

15 Claims, 6 Drawing Sheets

PET CARE MACHINE

CROSS-REFERENCE TO RELATED APPLICATION

This application claims the priority benefit of China application serial no. 202410076365.6, filed on Jan. 18, 2024. The entirety of the above-mentioned patent applications is hereby incorporated by reference herein and made a part of this specification.

BACKGROUND

Technical Field

The present disclosure relates to the field of devices for grooming or caring of animals, and in particular to a pet care machine.

Description of Related Art

Many people like cats but annoyed by cat hair. Regular vacuum cleaner can not pick up loose hair from cat body and, it will be very difficult to clean when loose hair fall off. The patent CN201523596U of ECOVACS discloses a pet vacuum cleaner. The AC vacuum cleaner with special comb can take off loose hair from body of cat and dog, and can vacuum loose from comb teeth before it fall off on to ground. However, this technology is more applicable to the dogs and less applicable to the cats because the dogs are relatively obedient to their masters to walk to the vacuum cleaners for combing and also can tolerate the noises generated by the common vacuum cleaners. In contrast, the cats are relatively independent and less obedient to their masters to calmly stay at a specific time and place and, many cats are sensitive to vacuum noise.

Therefore, a quieter vacuum cleaner is expected, which is easily movable and can comb cat hair anytime and anywhere with sufficient vacuum force to take away loose hair before it falls on to ground.

SUMMARY

In order to address the above issues, the object of the present disclosure is to provide a pet care machine.

Solution 1

The present disclosure offers a pet care machine, comprising: a machine housing, internally provided with an air channel having at least one air channel inlet and at least one air channel outlet; an electric fan, configured to stir air and form an air flow flowing into at least one air channel inlet and out of at least one air channel outlet in the air channel; a combing member, comprising at least one group of comb teeth, wherein the comb teeth have a received state and an extended state; a motion area, located outside the air channel and communicating at least one air channel outlet with at least one air channel inlet and providing a space for transition of the comb teeth between the extended state and the received state; wherein in the received state, tooth tips of the comb teeth are received in the motion area and close to the machine housing; in the extended state, the tooth tips of the comb teeth are extended out relative to the motion area and away from the machine housing to comb pet hairs; at least part of the air flow coming out of the air channel outlet runs through the comb teeth in the received state and flows into at least one air channel inlet.

In the pet care machine provided by the solution 1 of the present disclosure, the motion area provides a space for transition of the comb teeth between the extended state and the received state, and the motion area is in communication with at least once air channel outlet and at least one air channel inlet; at least part of the air flow coming out of the air channel outlet runs through the comb teeth in the received state and flows into at least one air channel inlet. In this case, the air flow coming out of the air channel outlet can help removing loose hair from the comb teeth and make it more easily vacuumed into the air channel along with the sucking air flow generated by the negative pressure in the air channel inlet. Therefore, the pet hairs combed down can be effectively removed. In addition, since the air flow at the air channel outlet can assist the hairs to separate from the combing member, a smaller sucking force at the air channel inlet can suck in the floating hairs. Thus, an electric fan with a lower power can be used to lower the noise. The solution is structurally simple and easy to move and can be used to comb the cats anytime and anywhere.

Solution 2

The present disclosure offers a pet care machine, comprising: a machine housing, internally provided with an air channel having at least one air channel inlet and at least one air channel outlet; an electric fan, configured to stir air and form an air flow flowing into at least one air channel inlet and out of at least one air channel outlet in the air channel; a battery, configured to provide electric energy to the electric fan; a combing member, comprising at least one group of comb teeth, wherein tooth tips of the comb teeth can extend out relative to the machine housing to comb pet hairs; wherein an air outlet of the electric fan is closer to the tooth tips in the extended state than an air inlet of the electric fan; the machine housing has a holding portion for a user to hold, and at least part of the electric fan or the battery is located inside the holding portion.

In the pet care machine provided by the solution 2 of the present disclosure, the air outlet of the electric fan is closer to the tooth tips in the extended state than the air inlet of the electric fan, and at least part of the electric fan or the battery is located inside the holding portion. Therefore, while the pet care machine is compact in size, a sufficiently large space is reserved between the air inlet of the electric fan and the air channel inlet to accommodate the hairs entering the air channel. The pet care machine has a sufficiently large accommodating chamber and is easy to hold and easy to operate and carry with single hand.

The present disclosure offers a pet care machine, further comprising: a motion area, providing a space for hairs to enter the air channel inlet; wherein the motion area is located outside the air channel and communicates at least one air channel outlet with at least one air channel inlet. The air flow coming out of the air channel outlet can remove the hairs from the comb teeth and the removed hairs can be more easily vacuumed into the air channel along with the sucking air flow generated by the negative pressure in the air channel inlet. Therefore, the pet hairs combed down can be effectively removed. In addition, since the air flow at the air channel outlet can assist the hairs to separate from the combing member, a smaller sucking force at the air channel inlet can suck in the floating hairs. Thus, an electric fan with a lower power can be used to lower the noise.

Solution 3

Furthermore, the present disclosure offers a pet care machine comprises: an electric fan, configured to stir air and generate an air flow and a negative pressure, and comprise an air inlet and an air outlet; a battery, configured to provide electric energy to the electric fan; a switch, configured to control a circuit between the battery and the electric fan to be on and off; a combing member, configured to comb pet hairs and at least comprise a base and comb teeth; a drive mechanism, configured to drive the combing member to enable the combing member to change between an extended state and a received state; a dust collection mechanism, located upstream of the electric fan to accommodate pet hairs; a motion area, located near the combing member to provide a space for transition of the combing member between the extended state and the received state; an air channel, configured to run an air flow generated by the electric fan and have an air channel inlet and an air channel outlet; the air channel inlet is closer to the down stream of motion area, and the air channel outlet is closer to the up stream of motion area, at least part of the airflow generated by the electric fan reaches the motion area through the air channel outlet, wherein a distance from the air inlet of the electric fan to the comb teeth is longer than a distance from the air outlet of the electric fan to the comb teeth; in the extended state, the comb teeth of the combing member extend out relative to a body of the pet care machine to comb pet hairs and at this time, the motion area is opened; in the received state, the comb teeth of the combing member are near the body of the pet care machine, and the comb teeth point toward the air channel inlet, and at this time, more parts of the motion area are plugged by the combing member.

In the pet care machine provided by the solution 3 of the present disclosure, the machine includes an electric fan, a battery, a combing member, a drive mechanism, a dust collection mechanism, a motion area and an air channel. The head and tail of the air channel are connected through the motion area. In the air flow coming out of the air channel outlet, at least part of the air flow can flow into the air channel inlet. In the extended state, the comb teeth of the combing member extend out relative to the body of the pet care machine to comb pet hairs. At this time, the motion area is more opened and fresh air flows from the outside of the pet care machine through the motion area into the air channel inlet and then through the air channel outlet into the motion area to communicate with the atmosphere outside the pet care machine. In the received state, the comb teeth of the combing member are near the body of the pet care machine, with the comb teeth pointing toward the air channel inlet. At this time, a part of the motion area is plugged by the combing member and the external atmosphere runs through the tips of the comb teeth into the air channel inlet and through the interior of the air channel and then out of the air channel outlet; at least part of the air flow coming out of the air channel outlet runs through the tips of the comb teeth along the combing member into the air channel inlet to form a circulating air flow. Thus, there are air flows entering the air channel inlet through upper and lower sides of the tips of the comb teeth, thereby effectively removing the floating hairs on the tips of the comb teeth.

Further, as long as the battery has sufficient battery level, the user can use it to comb the cat anytime and anywhere without forcing the cat to move to nearby the pet care machine, bringing convenience to the use.

Furthermore, a shortest perpendicular distance from the air inlet of the electric fan to the combing member is longer than a shortest perpendicular distance from the air outlet of the electric fan to the combing member, that is, the air inlet of the electric fan is away from the combing member, i.e. away from the air channel inlet. In this case, the electric fan is in an inverted state relative to the air channel inlet, which ensures the pet care machine is small in external size and is not too long, helping operate the drive mechanism of the combing member with single hand.

The pet care machine in any one of the solutions of the present disclosure further has the following characteristics: the comb teeth can perform state change by rotation (e.g. swing) or extension or the like or by composite movement combining multiple methods. By the state change, the floating hairs can be brought to near the machine housing and into the motion area, helping the floating hairs enter the air channel inlet.

The pet care machine in any one of the solutions of the present disclosure further has the following characteristics: a battery, configured to provide electric energy to the electric fan; wherein the air outlet of the electric fan is closer to the tooth tips in the extended state than the air inlet of the electric fan; the machine housing has a holding portion for a user to hold, the electric fan and the battery form an electric fan assembly, and at least part of the electric fan assembly is located inside the holding portion. So, the pet care machine is compact in size and easy to operate and carry with single hand.

The pet care machine in any one of the solutions of the present disclosure further has the following characteristics: an auxiliary intake, comprising at least one intake hole disposed on the machine housing and communicated with the air channel. When the high-speed air flow runs through the air channel, a part of the external atmosphere may enter the air channel through the intake hole due to low pressure of the fluid, increasing the ventilation volume in the air channel, and helping blow away the hairs on the tips of the comb teeth and further reducing the temperature of the circulating air flow.

The pet care machine in any one of the solutions of the present disclosure further has the following characteristics: the auxiliary intake hole is disposed between the air outlet of the electric fan and the air channel outlet. In this way, the reduction of the negative pressure of the air channel inlet is avoided, and the air discharge volume of the air channel outlet is increased, helping the hairs separate from the combing member.

The pet care machine in any one of the solutions of the present disclosure further has the following characteristics: a power adjusting mechanism, configured to, when the comb teeth are in the extended state, a power of the electric fan is adjusted to W1; when the comb teeth are in the received state, the power of the electric fan is adjusted to W2, wherein W2>W1. In the extended state, the power of the electric fan can be further lowered, so as to lower the noise and increase the endurance time of the battery.

The pet care machine in any one of the solutions of the present disclosure further has the following characteristics: a drive mechanism, configured to drive the combing member and the power adjusting mechanism to enable the state change of the comb teeth and the power adjustment of the electric fan to be performed synchronously. In this way, the user can perform operations with single hand more easily.

The pet care machine in any one of the solutions of the present disclosure further has the following characteristics: the combing member, when performing state change, triggers the power adjusting mechanism to perform power adjustment. In this way, the user can perform operations with single hand more easily.

The pet care machine in any one of the solutions of the present disclosure further has the following characteristics: a dust collection mechanism, disposed in the air channel, and located between the air inlet of the electric fan and the air channel inlet to collect pet hairs combed down; wherein the air channel has an upper layer and a lower layer; the electric fan is disposed on the upper layer, the air channel inlet is disposed on the lower layer, and the dust collection mechanism extends from nearby the air inlet of the electric fan to nearby at least one air channel inlet. With such structural disposal, the accommodating chamber is big enough to accommodate more floating hairs; and the pet care machine can be minimized in entire volume and length and width sizes, helping single-hand operation and ease of carry.

The pet care machine in any one of the solutions of the present disclosure further has the following characteristics: an inlet air filter is disposed upstream of the electric fan, a thin plate with small holes is disposed upstream of the inlet air filter, and the thin plate extends from nearby the inlet air filter to nearby at least one air channel inlet along the air channel; on the thin plate, one or more negative pressure transfer regions with small holes are formed respectively along a direction perpendicular to the air channel and a direction non-perpendicular to the air channel. With the thin plate, the inlet air filtration area and the inlet air filtration path can be increased such that the pet care machine can filter and accommodate as many hairs as possible.

The pet care machine provided by any one of the solutions of the present disclosure further has the following characteristics: one or more comb teeth have a windward portion closer to the air channel outlet relative to the tooth tip. A windward end of the windward portion facing toward the air channel outlet is used for flow diversion, and the shape may be a pointed or arc-shaped, or a flow guide groove may be disposed on a region of the windward portion extending toward the tooth tip. When the hairs build up on the tooth tips, they look fluffy. In the received state, the above windward portion is more helpful for guiding the air flow flowing out of the air channel outlet to push the hairs separate from the comb teeth.

The pet care machine in any one of the solutions of the present disclosure further has the following characteristics: the air channel inlet is away from the base in the combing member and close to downstream of the motion area, the air channel outlet is close to the base in the combing member and also close to upstream of the motion area, and at least part of the air flow generated by the electric fan reaches the motion area through the air channel outlet; when the electric fan is started in the extended state, fresh air flows from outside of the pet care machine through the motion area into the air channel inlet and finally reaches the motion area through the air channel outlet; when the electric fan is started in the received state, external atmosphere enters the air channel inlet through the tips of the comb teeth and flows out of the air channel outlet through the air channel, and at least part of the air flow flowing out from the air channel outlet runs through the tips of the comb teeth along the combing member into the air channel inlet to form a circulating air flow.

The pet care machine provided by any one of the solutions of the present disclosure further has the following characteristics: the combing member further includes a scraping plate; the comb teeth extend out from the base and the combing member can rotate from the extended state to the received state. When the combing member is in the extended state, the scraping plate is close to the base and away from the comb teeth. When the combing member rotates from the extended state to the received state, the scraping plate runs over the roots of the comb teeth toward the tips of the comb teeth. When the combing member is in the received state, the scraping plate moves close to the tips of the comb teeth and plugs at least part of the gaps between the comb teeth.

The pet care machine in any one of the solutions of the present disclosure further has the following characteristics: the drive mechanism is abutted against the base, with a spring disposed therebetween; in the extended state, a scraping plate is sleeved outside the base; the combing member further comprises a swing piece having two swing arms, and one end of each of the two swing arms is rotatably mounted on the body of the pet care machine and the other is connected to the scraping plate; the comb teeth are disposed on the base; when the drive mechanism pushes the base to rotate, the swing piece rotates along with the base to bring the scraping plate to run over the roots of the comb teeth toward the tips of the comb teeth, and the combing member changes from the extended state to the received state.

The pet care machine provided by any one of the solutions of the present disclosure further has the following characteristics: two springs denoted as a first spring and a second spring are disposed between the drive mechanism and the base. In the extended state, two springs are both in free state. When the drive mechanism is moved under pressure, the first spring is compressed and the second spring is stretched. When the pressure on the drive mechanism is removed, the two springs are respectively reset. The first spring pushes the drive mechanism to reset and the second spring pulls the base to reset to the extended state.

The pet care machine in any one of the solutions of the present disclosure further has the following characteristics: an inlet air filter is disposed upstream of the electric fan, a thin plate with small holes is disposed upstream of the inlet air filter, at least part of the periphery of the thin plate is sealingly connected with an inner wall of the air channel, a gap is reserved between a first surface of a holed region of the thin plate and the inner wall of the air channel, a negative pressure generated by the electric fan reaches the first surface of the thin plate and reaches a second surface of the thin plate through the small holes and thus air vacuumed into the air flow flows toward the inlet air filter through the small holes on the thin plate and floating hairs carried in the air flow are intercepted by the small holes on the thin plate.

DESCRIPTION OF THE EMBODIMENTS

In the descriptions of the present disclosure, it is noted that unless otherwise stated or defined clearly, the terms such as "mount", "connect" and "couple" and the like shall be understood in broad sense, for example, may be a fixed connection, or a detachable connection, or integral connection; or mechanical connection or electric connection or mutual communication; or direct connection or indirect connection through an intermediate medium, or internal communication of two elements, or mutual reaction relationship of two elements. Those skilled in the arts can understand the specific meanings of the above terms in the present disclosure based on specific situations.

In order to make the technical means, creative features, achieved objects and efficacy of the present disclosure intelligible, the pet care machine of the present disclosure will be further detailed below in combination with specific embodiments and drawings.

Embodiment 1

As shown in FIGS. 1 to 4, this embodiment provides a pet care machine 100 to care for hairs of a pet. The pet care machine 100 includes a machine housing 10, an electric fan 11, a battery 12, a switch 13, an air channel 14, a circuit board 15, a combing member 18, a drive mechanism 19, a dust collection mechanism and a motion area 141.

The machine housing 10 has a hollow handle 101 which can serve as a part of the air channel 14. A holding portion to be held by a user is formed on the handle 101.

The electric fan 11 is disposed inside the machine housing 10 and partially located inside the handle 101 to stir the air to generate an air flow and a negative pressure. The electric fan 11 includes an air inlet close to an inlet air filter 143 and away from the combing member 18. The electric fan 11 further includes an air outlet away from the inlet air filter 143 and close to the combing member 18. The electric fan 11 may be an axial-flow high-speed brushless electric fan with a power being 40 W or higher and a rotation speed being 60000 rpm or higher. The electric fan 11 has low noise and large air volume. In this way, the floating hairs on a tooth tip can be effectively blown away while the cats will not be frightened (under the premise of using the pet care machine of the present invention).

Figure 4:
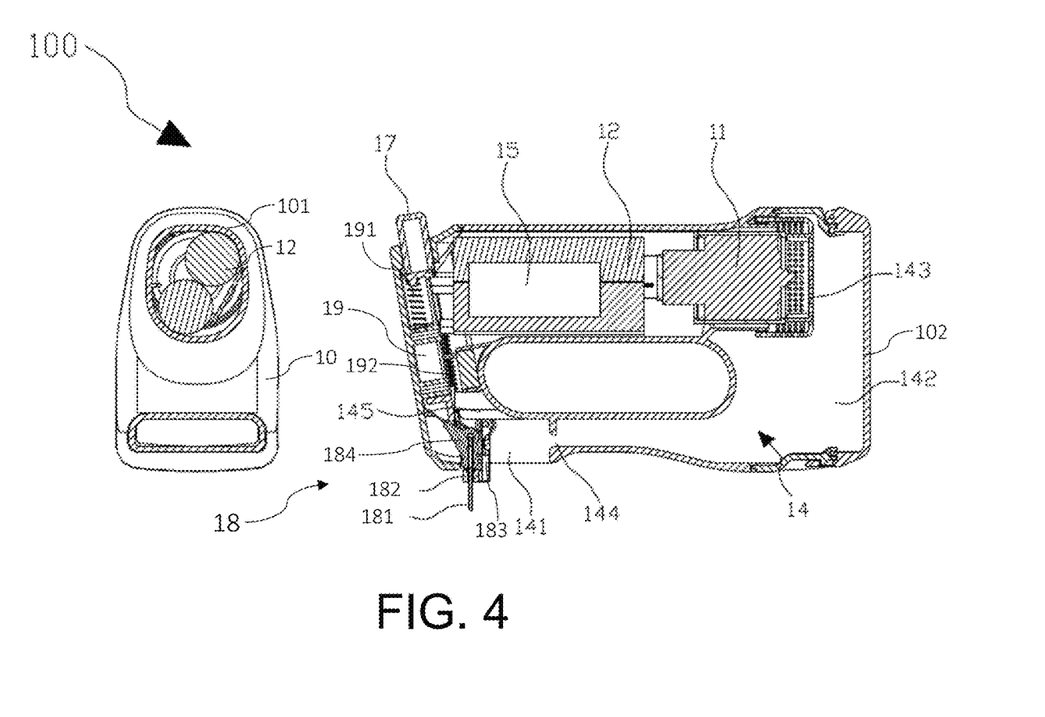
FIG. 4 is a sectional view illustrating a pet care machine in an extended state according to an embodiment 1 of the present disclosure.

The battery 12 is disposed inside the handle 101 to provide electric energy to the electric fan 11. As shown in FIG. 4, the battery includes two chargeable battery cells.

In this embodiment, the air channel 14 has an upper layer and a lower layer. The electric fan 11 is disposed on the upper layer and the air channel inlet 144 is located on the lower layer. The dust collection mechanism extends from nearby the air inlet of the electric fan to nearby an air channel inlet 144. As shown in FIG. 4, the air outlet of the electric fan 11 is closer to the tooth tips in an extended state than the air inlet of the electric fan 11. If the electric fan 11 is disposed on the lower layer, the air inlet of the electric fan 11 is closer to the tooth tip in an extended state than the air outlet of the electric fan 11, the air inlet of the electric fan 11 must face toward the motion area 141, and the accommodating chamber between the air inlet of the electric fan 11 and the motion area 141 can be too small, leading to failure to effectively collect hairs. However, if a sufficiently large accommodating chamber is disposed, the machine housing 10 will be oversized. The electric fan 11 and the battery 12 form an electric fan assembly, and at least part of the electric fan assembly is located inside the handle 101. This disposal minimizes length and width sizes of the machine housing 10 and maximizes the accommodating chamber. In this case, the machine housing 10 has sufficiently small volume, and is easy to hold and carry.

The circuit board 15 is disposed inside the handle 101 electrically connected with the battery 12 and the electric fan 11 to control the operation of the electric fan 11.

The switch 13 is disposed on the machine housing 10 to control the circuit board 15 and further control a circuit between the battery 12 and the electric fan 11 to be on or off.

The combing member 18 is at least partially located inside the machine housing 10 to comb pet hairs and at least includes multiple comb teeth 181 with a gap between adjacent comb tooth 181.

The drive mechanism 19 is used to drive the combing mechanism 18 to change between the extended state and a received state.

The dust collection mechanism is an accommodating chamber 142 disposed inside the machine housing 10 as a part of the air channel 14. The dust collection mechanism is located upstream of the electric fan 11 to accommodate pet hairs combed down. The air inlet filter 143 is further disposed upstream of the electric fan 11 to filter pet hairs.

Figure 3:
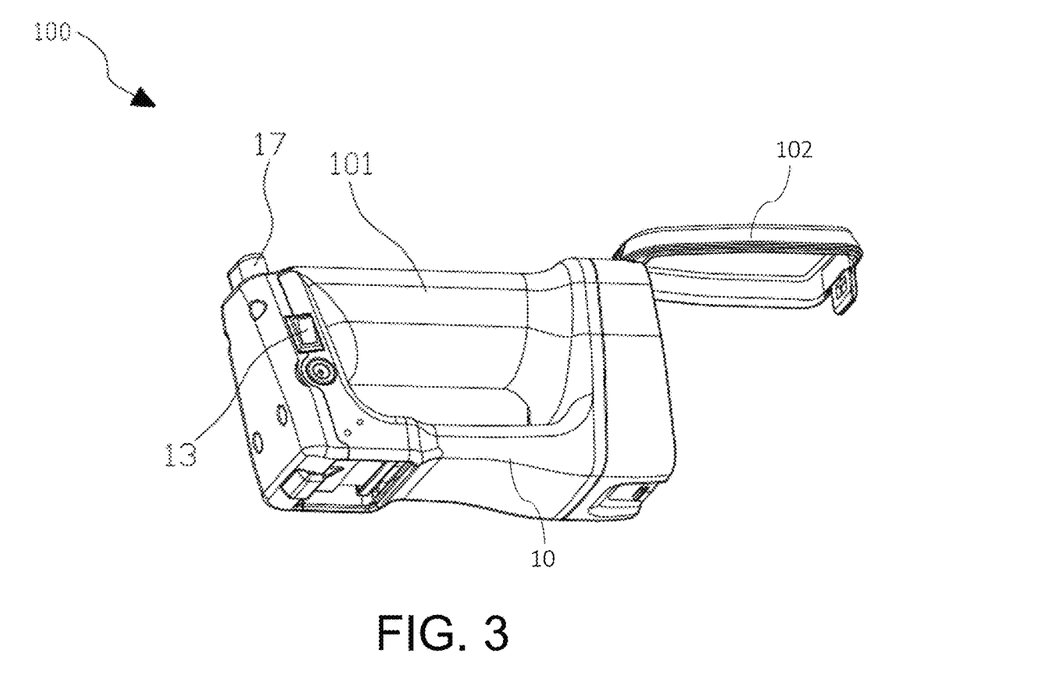
FIG. 3 is a schematic diagram illustrating a pet care machine in a received state, with an accommodating chamber opened, according to an embodiment 1 of the present disclosure.

As shown in FIG. 3, the machine housing 10 is further provided with a rotatably-opened cleaning cover 102. The cleaning cover 102 can be opened to empty the hairs collected in the accommodating chamber 142. In this embodiment, the cleaning cover 102 is disposed at the right side of the pet care machine 100. The cleaning cover 102 can be snap-fitted to the machine housing 10 by a structure such as a buckle and the like and also can be unbuckled and then rotatably opened.

The motion area 141 is disposed inside the machine housing 10 and in communication with the outside of the machine housing 10. The motion area 141 is disposed close to the combing member 18 to provide space for the combing member 18 to change between the extended state and the received state.

The air channel 14 is disposed inside the machine housing 10 for the air flow generated by the electric fan 11 to run through. The air channel 14 has an air channel inlet 144 and an air channel outlet 145. The air channel inlet 144 is close to the downstream of the motion area 141 and away from a base 183 in the combing member 18. The air channel outlet 145 is close to the base 183 in the combing member 18 and also close to the upstream of the motion area 141. At least part of the air flow generated by the electric fan 11 runs through the air channel outlet 145 to the motion area 141.

The head and tail of the air channel 14 are connected through the motion area 141. In the air flow coming out of the air channel outlet 145, at least part of the air flow can flow into the air channel inlet 144. The air flow running into the air channel inlet 144 sequentially flows through the accommodating chamber 142, the inlet air filter 143 and the electric fan 11 and then out of the air channel outlet 145. In this process, the hairs go through filtration of the inlet air filter 143 and fall into the accommodating chamber 142.

Figure 1:
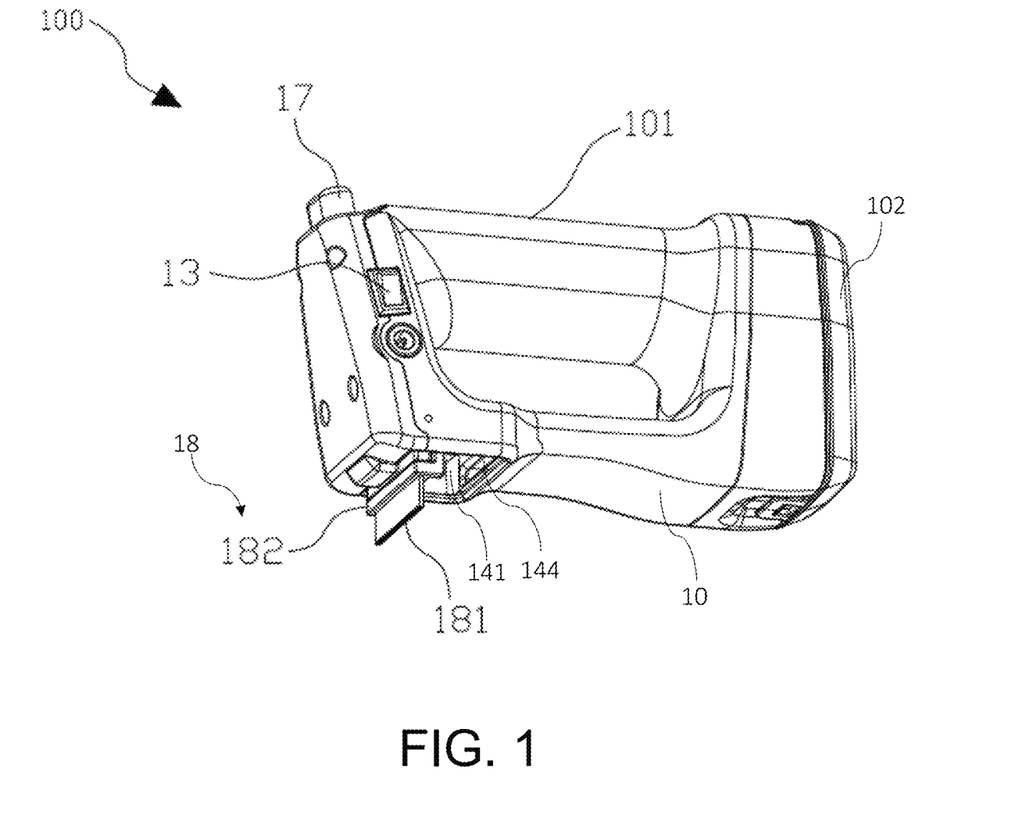
FIG. 1 is a schematic diagram illustrating a stereoscopic structure of a pet care machine in an extended state according to an embodiment 1 of the present disclosure.

As shown in FIG. 1, in the extended state, the comb teeth 181 of the combing member 18 is extended out from the machine housing 10 to comb pet hairs. At this time, the motion area is more opened and fresh air flows from the outside of the pet care machine 100 through the motion area 141 into the air channel inlet 144 and finally through the air channel outlet 145 into the motion area 141 to communicate with the atmosphere outside the pet care machine 100.

Figure 2:
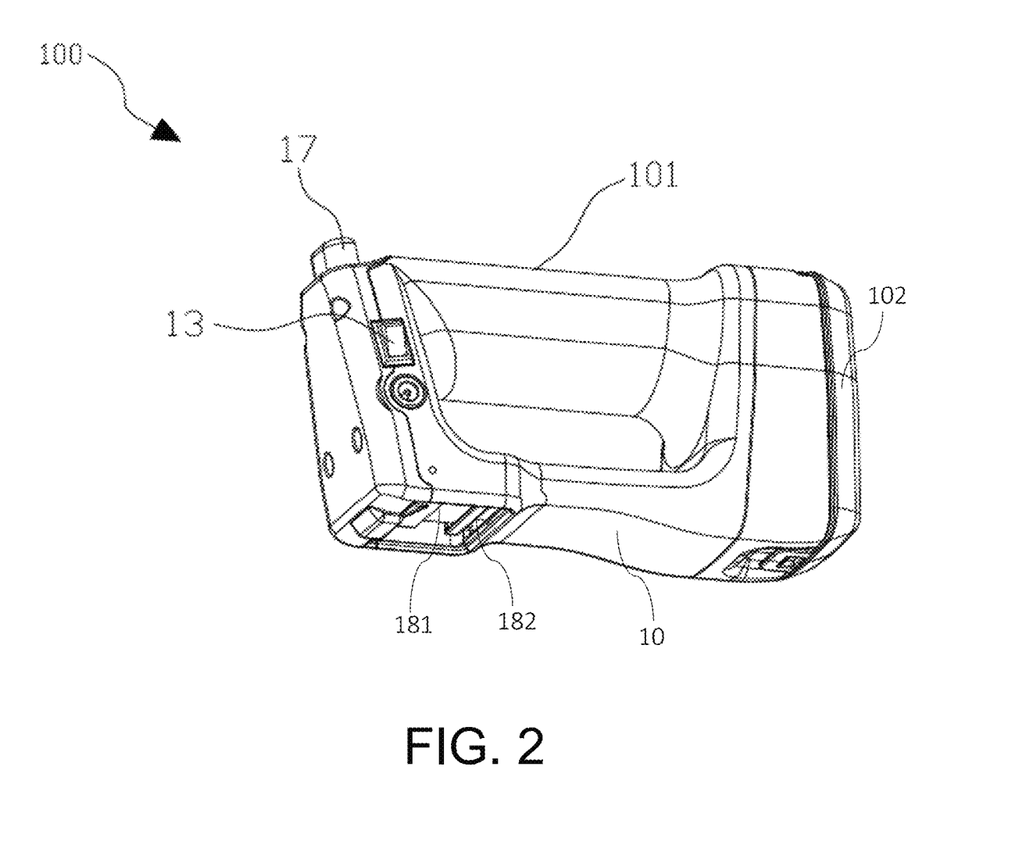
FIG. 2 is a schematic diagram illustrating a stereoscopic structure of a pet care machine in a received state according to an embodiment 1 of the present disclosure.

As shown in FIG. 2, in the received state, the combing member 18 is received in the motion area 141 with the comb teeth 181 pointing toward the air channel inlet 144. At this time, more parts of the motion area 141 are plugged by the combing member 18 and the external atmosphere runs through the tips of the comb teeth 181 into the air channel inlet 144 and through the interior of the air channel 14 and then out of the air channel outlet 145; at least part of the air flow coming out of the air channel outlet 145 runs through the tips of the comb teeth 181 along the combing member 18 into the air channel inlet 144 to form a circulating air flow. At the same time, the hairs stuck on the tips of the comb teeth 181 can be blown into the air channel inlet 144. The sectional area of the air channel inlet 144 is preferably maximized, and the ventilation area of the air channel 14 is preferably maximized.

As shown in FIGS. 1 and 4 to 6, in this embodiment, the combing member 18 further includes the base 183 and a scraping plate 182. The combing member 18 can rotate from the extended state to the received state. When the combing member 18 is in the extended state, the scraping plate 182 is close to the base 183 and away from the comb teeth 181. When the combing member 18 rotates from the extended state to the received state, the scraping plate 182 runs over the root of the comb teeth 181 toward the tips of the comb teeth 181. When the combing member 18 is in the received state, the scraping plate 182 moves close to the tips of the comb teeth 181 and plugs at least part of the gaps between the comb teeth 181. The main effect of the scraping plate 182 is to close the gaps between the comb teeth 181 to centralize the air flow to the tips of the comb teeth 181 while squeezing the hairs stuck on the comb teeth 181, so as to more effectively blow the hairs stuck on the tips of the comb teeth 181 into the air channel 14, thereby helping the hairs enter the air channel 14.

Figure 5:
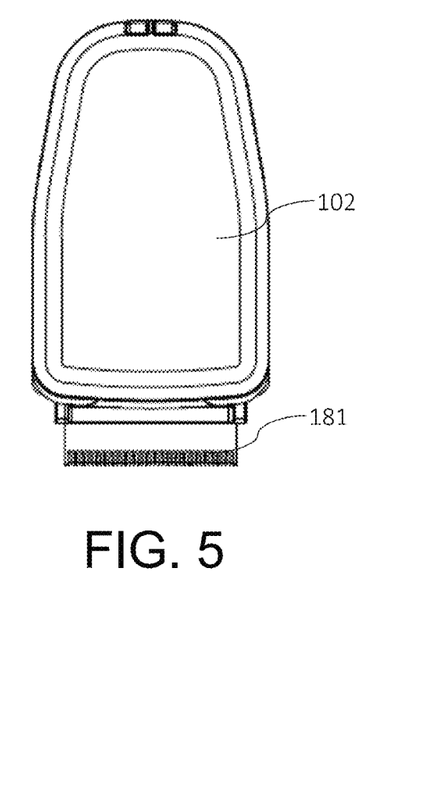
FIG. 5 is a right view illustrating a pet care machine in an extended state according to an embodiment 1 of the present disclosure.
Figure 6:
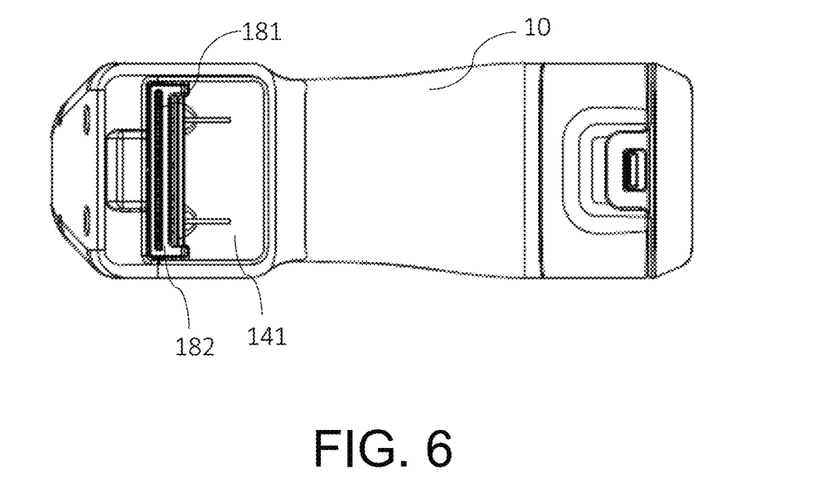
FIG. 6 is a bottom view illustrating a pet care machine in an extended state according to an embodiment 1 of the present disclosure.

As shown in FIG. 4, the base 183 is disposed at an edge of the motion area 141 and close to the air channel outlet 145, and the base 183 is further abutted against the drive mechanism 19 with two springs denoted as a first spring 191 and a second spring 192 disposed therebetween. In the extended state, two springs are both in free state. When a drive block 17 moves downward under pressure, the first spring 191 is compressed and the second spring 192 is stretched. When the pressure on the drive block 17 is removed, the two springs are respectively reset. The first spring 191 pushes up the drive block 17 and the second spring 192 pulls the base 183 to reset to the extended state. The scraping plate 182 is sleeved outside the base 183. The combing member 18 further includes a swing piece 184. The swing piece 184 has two swing arms. One end of each of the two swing arms is rotatably mounted on the machine housing 10 and the other end is fixedly connected to the scraping plate 182. The comb teeth 182 are disposed on the base 183 and extend away from the base 183 as shown in FIGS. 5 and 6. A width that comb teeth 182 are arranged left and right on the base 183 does not exceed a left-right width of the air channel inlet 144 and thus in the received state, a direction in which the air flow runs through all comb teeth 182 is basically parallel to a direction in which the comb teeth 182 extend, helping blow away the floating hairs stuck on the tips of the comb teeth 182.

A body of the drive mechanism 19 is partially disposed inside the machine housing 10 and partially located outside the machine housing 10 as the drive block 17. When the user presses the drive block 17, the drive mechanism 19 pushes the base 183 to rotate while the first spring 191 is compressed and the second spring 192 is stretched. The base 183 rotates while bringing the scraping plate 182 to rotate, such that the scraping plate 182 runs over the roots of the comb teeth 181 toward the tips of the comb teeth 181, and the combing member 18 changes from the extended state to the received state. When the user release the drive block 17, the springs between the drive mechanism 19 and the base 183 are reset to drive the combing member 18 to reset from the received state to the extended state. Hence the swing piece 184 and the drive block 17 are reset and the scraping plate 182 swings back to the periphery of the base 183 from the tips of the comb teeth.

Furthermore, the pet care machine 100 may further have a locking mechanism (not shown) to maintain the combing member 18 in the received state, so as to minimize the packaging volume of the pet care machine 100. The locking mechanism is a common locking structure which will not be described redundantly. By starting the locking mechanism, the combing member 18 can be maintained in the received state. At this time, the drive block 17 cannot drive the combing member 18 to enter the extended state. Only when the locking mechanism is disabled can the combing member 18 be reset to the extended state.

In this embodiment, the use process of the pet care machine 100 is described below.

The user can use a charging cable to charge the battery. When the battery has sufficient battery level, the user can start the electric fan 112 by the switch 13 and hold the pet care machine 100 by the handle 101 and release the combing member 18 by the locking mechanism to allow the combing member 18 to be in the extended state; then, the user can comb the hairs on the pet, especially the hairs on the cats. In the extended state, the combing member 18 extends toward a front-lower region of the pet care machine 100 and the motion area 141 is fully opened; air outside the pet care machine 100 enters the air channel inlet 144 from the motion area 141 and flows through the accommodating chamber 142 and the inlet air filter 143 in the air channel 14 to the electric fan 11, and then through the battery 12 and the circuit board 15, and then turns to go out of the air channel 14 from the air channel outlet 145 and reaches the motion area 141, thus communicating with the atmosphere outside the pet care machine 100.

When the floating hairs are stuck on the tips of the comb teeth 181 of the combing member 18, the user may press the drive block 17 with a thumb while holding the handle 101 to enable the combing member 18 to rotate from the extended state to the received state.

In the received state, the combing member 18 is basically parallel to a bottom surface of the pet care machine 100, and the tips of the comb teeth 181 point to and stay close to the air channel inlet 144. At this time, the combing member 18 plugs more parts of the motion area 141 and the scraping plate 182 closes at least part of the gaps between the adjacent comb teeth and at the same time pushes the hairs on the combing member 18 to gather at the tips of the comb teeth 181. The external atmosphere enters the air channel inlet 144 through the tips of the comb teeth 181 and flows through the interior of the air channel 14 and out of the air channel outlet 145. At least part of the air flow coming out of the air channel outlet 145 enters the air channel inlet 144 through the tips of the comb teeth 181 along the combing member 18 to form a circulating air flow. Thus, there are air flows entering the air channel inlet 144 through upper and lower sides of the tips of the comb teeth 181, thereby effectively removing the floating hairs on the tips of the comb teeth 181.

In the extended state, the external air flow can smoothly run through the electric fan 11 and the electric fan 11 can be cooled down.

In the received state, a part of the air flow flowing through the electric fan 11 reenters the air channel inlet 144 to form a circulating air flow. The electric fan 11 has low power and hence only generate a small amount of heat. When the electric fan 11 runs in full power, a running time of the battery 12 is about 30 minutes, the electric fan 11 will not be overheated. In the received state, the communication between the air channel inlet 144 and the external atmosphere is plugged more than in extended state but not completely cut off and therefore there is still external fresh air entering the air channel 14 and running to the electric fan 11, which can also prevent the overheat of the electric fan 11.

In addition to the air channel inlet 144 and the air channel outlet 145 at both ends of the air channel 14, intake holes may be disposed on the housing enclosing the air channel 14. These intake holes are in communication with the air channel 14. When a high-speed air flow flows through the air channel 14, a part of the external atmosphere may enter the air channel 14 through the intake holes due to low pressure of the fluid, increasing the ventilation volume in the air channel 14, and helping blow away the hairs on the tips of the comb teeth 181. These intake holes are preferably disposed between the air outlet of the electric fan 11 and the combing member 18.

Figure 7:
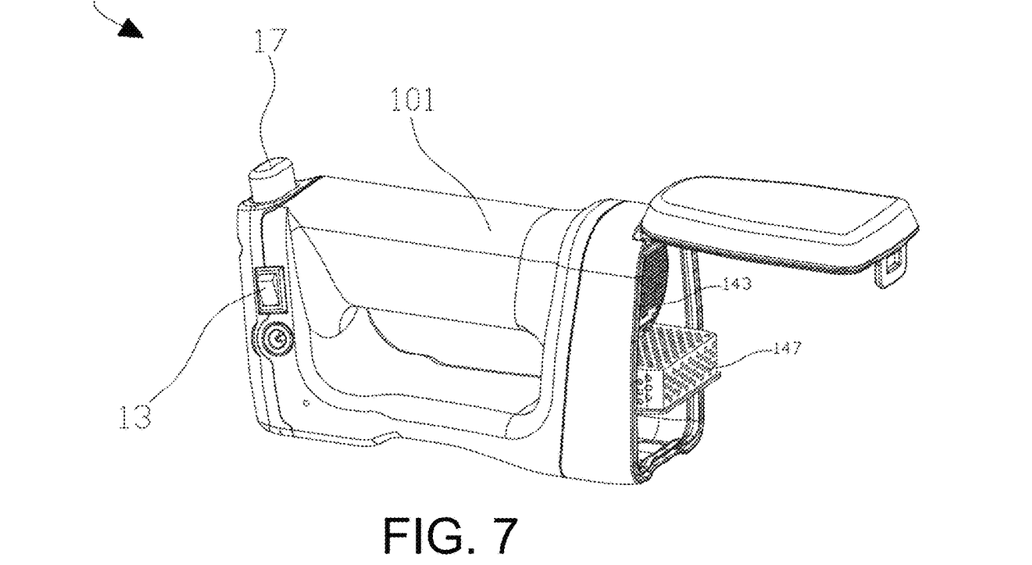
FIG. 7 is a schematic diagram illustrating a stereoscopic structure of a pet care machine provided with a thin plate with holes according to an embodiment 1 of the present disclosure.
Figure 8:
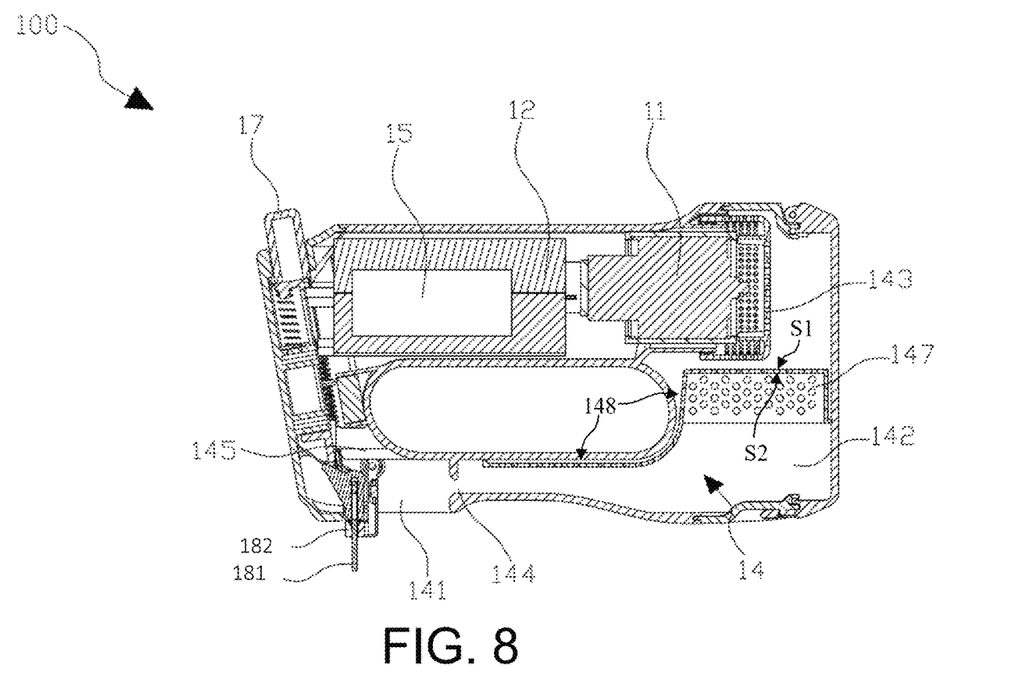
FIG. 8 is a sectional view illustrating a pet care machine provided with a thin plate with holes according to an embodiment 1 of the present disclosure.

As shown in FIGS. 7 and 8, the inlet air filter 143 is located in the air channel 14 upstream of the air inlet of the electric fan 11, and close to the air inlet of the electric fan 11. In order to facilitate single-hand operation, the pet care machine 100 needs to be small in external size to enable the inlet air filter 143 to have a small sectional area perpendicular to the air channel. When the hairs are built up on a surface upstream of the inlet air filter 143, it is easy to plug the inlet air filter 143 and cut off the air channel 14.

Therefore, in this embodiment, a thin plate 147 with small holes is disposed upstream of the inlet air filter 143, and at least part of the periphery of the thin plate 147 is connected sealingly with an inner wall of the air channel 14. A gap 148 is reserved between a first surface S1 of a holed region of the thin plate 147 and the inner wall of the air channel 14. A negative pressure generated by the electric fan 11 can reach the first surface S1 of the thin plate 147 with small holes and further reach a second surface S2 of the thin plate 147 through the small holes. The holed region in the thin plate 147 which can transfer negative pressure forms a negative pressure transfer region. Thus, the air vacuumed into the air flow can flow to the inlet air filter 143 through the small holes on the thin plate 147 and the floating hairs carried by the air flow can be intercepted by the small holes on the thin plate 147.

The floating hairs in the air flow can be intercepted by the mesh holes (small holes) on the thin plate 147 and the dusts carried in the air flow can penetrate through the mesh holes but can be intercepted by the inlet air filter 143. The thin plate 147 together with the mesh holes can extend all the way toward the air channel inlet 144 from the inlet air filter 143, equivalent to increasing the area of the inlet air filtration so as to hold more floating hairs in the accommodating chamber 142.

The thin plate 147 with small holes may be rectangular or arc-shaped, and may include one small plate or two or more small plates, and may also be distributed across the whole inner wall of the air channel 14.

Furthermore, in FIG. 8, the thin plate 147 is disposed by sealingly connecting the entirety of the periphery of the thin plate 147 with the inner wall of the air channel 14. In practical use, a front portion of the periphery of the thin plate 147 may be connected sealingly with the inner wall of the air channel 14 and a rear portion of the periphery of the thin plate 14 is disposed integrally with the inlet air filter 143.

Because it is a chargeable pet care machine 100, as long as it has sufficient battery level, the user can use it to comb the cat anytime and anywhere without forcing the cat to move to nearby the pet care machine 100 but holding the pet care machine 100 close to the cat, and even can comb the hairs of the cat and suck the floating hairs into the accommodating chamber in a moving state on a trip, for example, in a traveling car.

Some cats are sensitive to the noise, and the axial-flow high-speed brushless motor has a noise much lower than that of a centrifugal motor in the vacuum cleaner. Therefore it is more applicable to combing the cats.

Embodiment 2

In the embodiment 2, the structures same as in the embodiment 1 are assigned same numerals with the same descriptions omitted.

In the embodiment 2, a power adjusting mechanism 20 is added on the basis of the pet care machine 100 in the embodiment 1. The power adjusting mechanism 20 is used to, when the comb teeth 181 are in the extended state, the power of the electric fan 11 is adjusted to W1, and when the comb teeth 181 are in the received state, the power of the electric fan 11 is adjusted to W2, where W2>W1. W2 may be the working power of the electric fan 11 in the embodiment 1 and W1 may be set to ¼ to ⅓ of the W2 (not limited hereto).

Figure 9A:
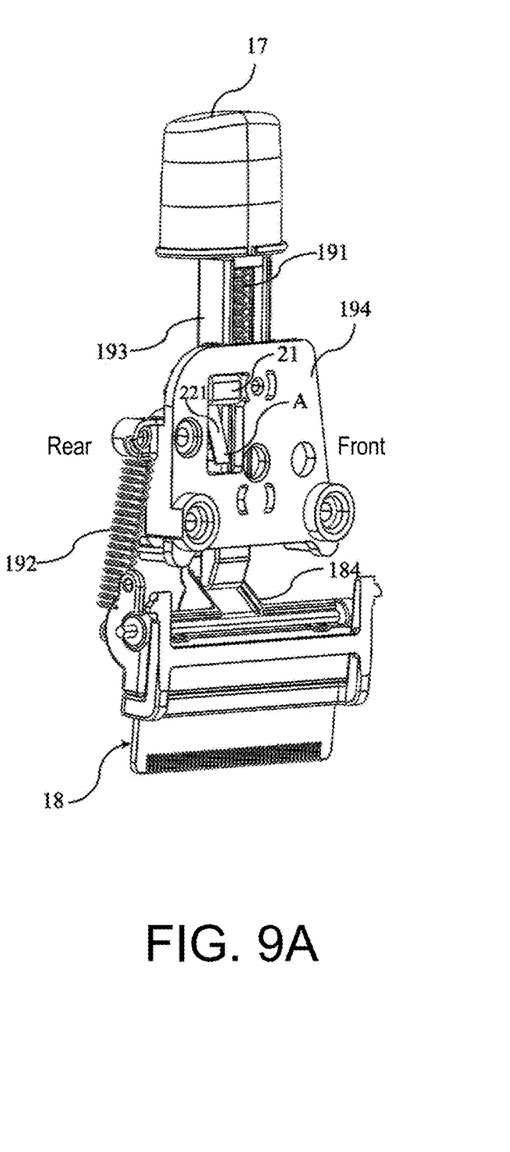
FIGS. 9A and 9B are a structural schematic diagram illustrating a power adjusting mechanism according to an embodiment 2 of the present disclosure, where FIG. 9B omits a fixing plate and a first spring as compared with FIG. 9A.
Figure 9B:
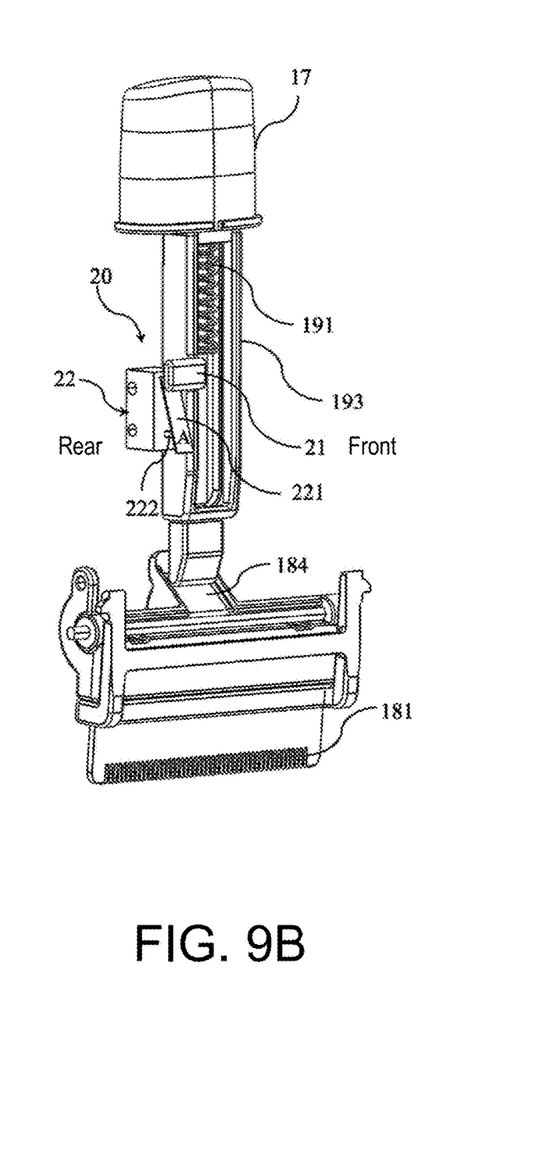

The power adjusting mechanism 20 can adjust the power of the electric fan 11 by adjusting a resistance or voltage in the circuit of the electric fan 11 and the like. As shown in FIGS. 9A and 9B, the power adjusting mechanism 20 includes a press block 21 and an inching switch 22.

The press block 21 is mounted on a drive rod 193 of the drive mechanism 19. An upper end of the drive rod 193 is connected with the drive block 17, and a lower end is used to swing the swing piece 184. A first spring 191 is disposed in the middle of the drive rod 193, and the drive rod 193 can bring the press block 21 and the upper end of the first spring 191 to move up and down relative to a fixing plate 194.

The inching switch 22 is opposed to the press block 21. When the press block 21 moves down, the press block 21 can touch and trigger the inching switch 22 to be on, and otherwise, when the press block 21 moves up, it moves away and turns off the inching switch 22. The inching switch 22 is connected with the electric fan 11 by a circuit or wireless communication. After the inching switch 22 is turned on, the power of the electric fan 11 is adjusted to W2; after the inching switch 22 is turned off, the power of the electric fan 11 is adjusted to W1.

Specifically, in the inching switch 22, a connection end of the press sheet 221 is correspondingly disposed near the press block 21 and an operation end A of the press sheet 221 is relatively raised up relative to a contact 222. During a move-down process, the press block 21 can touch and push forward the connection end and the connection end brings the operation end A to move quickly toward the contact 222. When the operation end A touches the contact 222, the inching switch 22 is turned on. At this time, the down-moving distance of the press block 21 is L; on the contrary, when the up-moving distance is the press block 21 is L, the press block 21 leaves the connection end and the operation end A leaves the contact 222. The inching switch 22 is turned off, and the power adjusting mechanism 20 and the drive mechanism 19 are both reset.

In this embodiment, the drive mechanism 19 drives the combing member and the power adjusting mechanism 20 at the same time to enable the state change of the comb teeth 181 and the power adjustment of the electric fan 11 to be performed synchronously. In other words, when the user presses the drive block 17, the drive mechanism 19 not only drives the combing member 18 to change from the extended state to the received state but also drives (trigger) the power adjusting mechanism 20 to adjust the power of the electric fan 11 from W2 to W1. On the contrary, when the users release the drive block 17, the drive mechanism 19 and the power adjusting mechanism 20 are both reset, the combing member 18 changes from the received state to the extended state, and the power of the electric fan 11 is adjusted from W1 back to W2.

Furthermore, in the present disclosure, the power adjusting mechanism may also not be triggered by the drive mechanism but by the combing member with the press block omitted. For example, when the combing member changes from the extended state to the received state, the combing member touches and turns on the inching switch, and when the combing member changes from the received state to the extended state, the combing member leaves and turns off the inching switch. In this way, the user can operate and drive the combing member and the power adjusting member simultaneously by one action, completing the state change and power adjustment at the same time.

Furthermore, in the present disclosure, in order to enable the airflow from the air channel outlet to flow toward the comb teeth in a better way, one or more comb teeth can be disposed as having a windward portion closer to the air channel outlet relative to the tooth tip. A windward end of the windward portion facing toward the air channel outlet is a pointed or arc-shaped flow guide end and thus the air flow at the air channel outlet can smoothly flow from the flow guide end to the comb teeth. Alternatively, a flow guide groove is disposed on a region of the windward portion extending toward the tooth tip, and each flow guide groove corresponds to one or more comb teeth. The air flow is guided by the flow guide groove to blow the hairs on the comb teeth.

In addition, in the above embodiments, the corresponding comb teeth are provided with a scraping plate. In the present disclosure, the scraping plate may not be provided and by suction of the air channel inlet and blowing of the air channel outlet in the motion area, it can be guaranteed that the hairs are removed from the comb teeth and blown into the air channel inlet. With this disposal, the power of the axial-flow electric fan is fully utilized. Although the negative pressure of the air channel inlet may be smaller than that of the centrifugal electric fan, the air flow of the air channel outlet can help remove the floating hairs from the comb teeth, that is, the air flow of the air channel outlet pushes and the air flow of the air channel inlet sucks, so as to form a resultant force to remove the floating hairs. Once the floating hairs are removed from the comb teeth, the negative pressure transferred by the axial-flow electric fan to the air channel inlet can be sufficient to fly the floating hairs into the air channel inlet, effectively removing the floating hairs.

In addition, in the above embodiments, the combing member performs state change by swing. In the present disclosure, the combing member may also perform state change by extension. For example, the extension may be as follows: a penetration hole corresponding to the comb teeth is disposed on a top plate of the motion area, and the comb teeth can move up and down relative to the top plate; when the comb teeth move down a given distance, the tooth tips extend out of the motion area and also out of the machine housing, so as to perform combing action; when the comb teeth move up a given distance, the tooth tips retract to the motion area or into the top plate. In this process, a scraping plate is formed on a surface region of the top plate corresponding to the comb teeth to scrape the floating hairs off the comb teeth. One or more penetration holes may be disposed, and one penetration hole corresponds to a group of comb teeth, or one penetration hole only corresponds to one or more comb teeth of a group. In addition, multiple rows of comb teeth may also be set on the base of the combing member, and each row of comb teeth may be a group.

Furthermore, in the motion area, the air channel outlet may be located at a position opposed to the air channel inlet or located nearby the comb teeth or located only facing toward the comb teeth. For the extending comb teeth, when the air channel outlet faces toward the comb teeth from the above, the penetration hole on the top plate of the motion area may be used as the air channel outlet.

Furthermore, in the present disclosure, the air channel inlet may be bell-shaped to receive the floating hairs removed or blown from the comb teeth.

In addition, in the above embodiment, corresponding to the two layers of the air channel, the machine housing is divided to an upper layer and a lower layer, and the user's hand can pass through the hollow area between the two layers to hold the upper layer of the machine housing. In the invention, the machine housing may also be not layered, with no hollow area, only disposed a depressed area for the user to hold, so that the height of the pet care machine can be further reduced.

In addition, in the above embodiment, the state change of the combing member is carried out by a one-handed operation, that is, each state change requires a one-handed operation. In the present invention, the state change of the combing member may also be carried out automatically according to the use of the pet care machine without manual operation. For example, by setting the sensor and controller, when the pet care machine is sensed within a certain distance from the pet care machine, the comb teeth are controlled to enter the extended state by controller automatically, and when the pet care machine is sensed to leave the pet a certain distance, the comb teeth are controlled to enter the received state by controller automatically. In addition, the induction parameter of the sensor is not limited to the distance, but may also be other parameter, such as the force of the comb teeth (force duration or frequency), according to the force of the comb teeth to determine whether the pet care machine is combing pet hairs, if so, the controller control the comb teeth to keep in the extended state, otherwise control the comb teeth to change from the extended state to the received state.

In the above embodiments, the air channel has only one air channel inlet and one air channel outlet. In addition, in the present invention, the air channel may have a plurality of air channel inlets and outlets. The air stirred by the electric fan maybe circulated simultaneously through all the air channels inlet and all the air channel outlets, or only through one or more air channel inlets and one or more air channel outlets. For example, the number of air channel inlet openings and air channel outlet openings may be adjusted according to the amount of pet hairs or the type of pet body or the state of the comb teeth, for suitable air volume, wind speed and ventilation position. For example, in the received state, only open one or more air channel inlets which opening right toward the comb teeth or the tips of the comb teeth, so that the air flow is more concentrated to remove the floating hairs from the comb teeth.

In the above embodiments, the handle is part of the air channel. In the present invention, the handle may also be set independently from the air channel, for example, a handle is independent arranged near the air channel, and the air channel does not pass through the handle, which is similar to the handle of a suitcase. In addition, the handle may also be disassembled, or a variety of shapes and sizes maybe installed according to the needs of users, for example, different sizes of the handle may be installed according to different hand sizes of users. Moreover, in the above embodiments, two ends of the handle are both attached to the machine housing. Optionally, in the present invention, the handle may be attached to the machine housing by only one end, and the other end is unattached and separated from the machine housing by a certain distance. In this case, an open area is formed between the unattached end and the machine housing.

Besides, the handle may be flexible, elastic, rotatable or foldable. When not in use, the handle may fit to the surface of the machine housing. When in use, the holding portion of the handle may be lifted away from the surface of the machine housing for a certain distance, but the end of the handle is a one-way stop structure, so the end will not be detached from the machine housing when it is lifted. The one-way stop structure may be a switch structure, which may be unlocked by pressing toward a specific direction, so that the handle may be detached from the machine housing for easy maintenance and replacement.

In the present invention, the machine housing may contain the outside surface of the main body of the pet care machine, and the machine housing may be not unibody but consist of many portions. Optionally, the machine housing may also be unibody.

Those skilled in the arts should understand that the present disclosure is not limited to the above embodiments and the descriptions in the embodiments and specification are used only to interpret the principle of the present disclosure. Various changes and improvements can be made to the present disclosure without departing from the spirit and scope of the present disclosure and shall fall within the scope of protection of the present disclosure. The scope of protection of the present disclosure is indicated by the appended claims and its equivalents.

What is claimed is:

1. A pet care machine, comprising:
a machine housing, internally provided with an air channel having one or more air channel inlets and one or more air channel outlets;
an electric fan, configured to form an air flow flowing into at least one of the one or more air channel inlets and out of at least one of the one or more air channel outlets in the air channel;
a combing member, comprising at least one group of comb teeth, wherein the comb teeth have a received state and an extended state; and
a motion area, located outside the air channel and communicating with the at least one of the one or more air channel outlets and the at least one of the one or more air channel inlets, and providing a space for transition of the comb teeth between the extended state and the received state,
wherein in the received state, tooth tips of the comb teeth are received in the motion area and close to the machine housing, in the extended state, the tooth tips of the comb teeth are extended out relative to the motion area and away from the machine housing to comb pet hairs,
wherein at least part of the air flow coming out of at least one of the one or more air channel outlets runs through the comb teeth in the received state and flows into at least one of the one or more air channel inlets,
wherein a portion of the machine housing is configured as a handle for the user to hold, allowing the user to operate the pet care machine to comb the hairs on the pet while operating to change the combing member between the extended state and the received state,
wherein the air flow exhausted from an air outlet of the electric fan flows through the handle, at least part of the exhausted air flow is circulated into at least one of the one or more air channel inlets after flowing out of the at least one of the one or more air channel outlets in the received state,
wherein a downstream end of the handle is connected to a portion of the machine housing defining at least one of the one or more air channel outlets such that at least part of the air flow flows through the handle, through the portion of the machine housing, then through the comb teeth.

2. The pet care machine of claim 1, further comprising:
a battery, configured to provide electric energy to the electric fan;
wherein the air outlet of the electric fan is closer to the tooth tips in the extended state than the air inlet of the electric fan;
the machine housing has a holding portion for a user to hold, and at least part of the electric fan or the battery is located inside the holding portion.

3. The pet care machine of claim 1, further comprising:
a power adjusting mechanism including a press block and an inching switch, wherein when the comb teeth are in the extended state, a power of the electric fan is adjusted to W1 by the power adjusting mechanism, when the comb teeth are in the received state, the power of the electric fan is adjusted to W2 by the power adjusting mechanism, wherein W2>W1,
when the combing member performs state change, the power adjusting mechanism is triggered to perform power adjustment.

4. The pet care machine of claim 3, further comprising:
a drive mechanism including a first spring and a second spring, configured to drive the combing member and the power adjusting mechanism to enable the state change of the comb teeth and the power adjustment of the electric fan to be performed synchronously.

5. The pet care machine of claim 1, further comprising:
a dust collection mechanism being an accommodating chamber, disposed in the air channel, and located between the air inlet of the electric fan and the one or more air channel inlets to collect pet hairs combed down;
wherein the air channel has an upper layer and a lower layer; the electric fan is disposed on the upper layer, the one or more air channel inlets are disposed on the lower layer, and the dust collection mechanism is extended from the air inlet of the electric fan to at least one of the one or more air channel inlets.

6. The pet care machine of claim 1, wherein,
an inlet air filter is disposed upstream of the electric fan, a thin plate with small holes is disposed upstream of the inlet air filter, and the thin plate is extended from the inlet air filter to at least one of the one or more air channel inlets along the air channel; on the thin plate, one or more negative pressure transfer regions with small holes are formed respectively along a direction perpendicular to the air channel and a direction non-perpendicular to the air channel.

7. A pet care machine, comprising:
a machine housing, internally provided with an air channel having one or more air channel inlets and one or more air channel outlets;
an electric fan, configured to form an air flow flowing into at least one of the one or more air channel inlets and out of at least one of the one or more air channel outlets in the air channel;
a battery, configured to provide electric energy to the electric fan;
a combing member, comprising at least one group of comb teeth, wherein the comb teeth have a received state and an extended state, and wherein in an extended state, tooth tips of the comb teeth are extended out relative to the machine housing to comb pet hairs;
wherein an air outlet of the electric fan is closer to the tooth tips in the extended state than an air inlet of the electric fan;
the machine housing has a hollow handle designed for single-handed operation of the pet care machine, wherein the handle forms part of the air channel, and at least part of the electric fan is located inside the handle;
when the electric fan is started in the received state, external atmosphere enters the air channel inlet, passes through the handle, and flows out of the air channel outlet, wherein at least part of the air flow flowing out from the air channel outlet runs through the tips of the comb teeth into the air channel inlet to form a circulating air flow.

8. The pet care machine of claim 7, further comprising:
a motion area, providing a space for hairs to enter the at least one of the one or more air channel inlets;
wherein the motion area is located outside the air channel and communicated with at least one of the one or more air channel outlets and the at least one of the one or more air channel inlets.

9. The pet care machine of claim 7, further comprising:
a dust collection mechanism being an accommodating chamber, disposed in the air channel, and located between the air inlet of the electric fan and the one or more air channel inlets to collect pet hairs combed down;
wherein the air channel has an upper layer and a lower layer; the electric fan is disposed on the upper layer, the one or more air channel inlets are disposed on the lower layer, and the dust collection mechanism is extended from the air inlet of the electric fan to at least one of the one or more air channel inlets.

10. The pet care machine of claim 7, wherein,
an inlet air filter is disposed upstream of the electric fan, a thin plate with small holes is disposed upstream of the inlet air filter, and the thin plate is extended from the inlet air filter to at least one of the one or more air channel inlets along the air channel; on the thin plate, one or more negative pressure transfer regions with small holes are formed respectively along a direction perpendicular to the air channel and a direction non-perpendicular to the air channel.

11. A pet care machine, comprises:
a machine housing, internally provided with an air channel having one or more air channel inlets and one or more air channel outlets;
an electric fan, configured to generate an air flow and a negative pressure, and comprise an air inlet and an air outlet;
a battery, configured to provide electric energy to the electric fan;
a switch, configured to control a circuit between the battery and the electric fan to be on and off;
a combing member, configured to comb pet hairs and at least comprise a base and comb teeth;
a drive mechanism including a first spring and a second spring, configured to drive the combing member to enable the combing member to change between an extended state and a received state;
a dust collection mechanism being an accommodating chamber, located upstream of the electric fan to accommodate pet hairs;
a motion area, located near the combing member to provide a space for transition of the combing member between the extended state and the received state;
an air channel, configured to contain the air flow generated by the electric fan, and having an air channel inlet and an air channel outlet;
wherein a distance from the air inlet of the electric fan to the combing member is longer than a distance from the air outlet of the electric fan to the combing member;
in the extended state, the comb teeth are extended out relative to a body of the pet care machine to comb pet hairs and at this time, the motion area is opened;
in the received state, the comb teeth are near the body of the pet care machine, and the comb teeth point toward the air channel inlet, and at this time, a part of the motion area is plugged by the combing member;
the machine housing has a hollow handle designed for single-handed operation of the pet care machine, wherein the handle forms part of the air channel, and at least part of the electric fan is located inside the handle;
when the electric fan is started in the received state, external atmosphere enters the air channel inlet, passes through the handle, and flows out of the air channel outlet, wherein at least part of the air flow flowing out from the air channel outlet runs through the tips of the comb teeth into the air channel inlet to form a circulating air flow.

12. The pet care machine of claim 11, wherein,
the air channel inlet is away from the base in the combing member and close to downstream of the motion area, the air channel outlet is close to the base of the combing member and also close to upstream of the motion area, and at least part of the air flow generated by the electric fan reaches the motion area through the air channel outlet;

when the electric fan is started in the extended state, fresh air flows from outside of the pet care machine through the motion area into the air channel inlet and finally reaches the motion area through the air channel outlet;

when the electric fan is started in the received state, external atmosphere enters the air channel inlet through the tips of the comb teeth and flows out from the air channel outlet through the air channel, and at least part of the air flowing out of the air channel outlet runs through the tips of the comb teeth along the combing member into the air channel inlet to form a circulating air flow.

13. The pet care machine of claim 11, wherein, the drive mechanism is abutted against the base, with a spring disposed therebetween;

in the extended state, a scraping plate is sleeved outside the base;

the combing member further comprises a swing piece having two swing arms, and one end of each of the two swing arms is rotatably mounted on the body of the pet care machine and the other is connected to the scraping plate;

the comb teeth are disposed on the base;

when the drive mechanism pushes the base to rotate, the swing piece rotates along with the base to bring the scraping plate to run over roots of the comb teeth toward the tips of the comb teeth, and the combing member changes from the extended state to the received state.

14. The pet care machine of claim 11, wherein, an inlet air filter is disposed upstream of the electric fan, a thin plate with small holes is disposed upstream of the inlet air filter, at least part of the periphery of the thin plate is sealingly connected with an inner wall of the air channel, a gap is reserved between a first surface of a holed region of the thin plate and the inner wall of the air channel, a negative pressure generated by the electric fan reaches the first surface of the thin plate and reaches a second surface of the thin plate through the small holes and thus air vacuumed into the air flow flows toward the inlet air filter through the small holes on the thin plate and floating hairs carried in the air flow are intercepted by the small holes on the thin plate.

15. The pet care machine of claim 14, wherein, the thin plate is extended from the inlet air filter to the air channel inlet along the air channel;

on the thin plate, the holed region is formed respectively along a direction perpendicular to the air channel and a direction non-perpendicular to the air channel.

* * * * *